(12) United States Patent
Cavalcante et al.

(10) Patent No.: US 8,934,557 B2
(45) Date of Patent: Jan. 13, 2015

(54) STATISTICAL JOINT PRECODING IN MULTI-CELL, MULTI-USER MIMO

(75) Inventors: Charles Casimiro Cavalcante, Fortaleza (BR); Alisson Guimarães, Lagoa Redonda (BR); Tarcísio Ferreira Maciel, Messejana (BR); Lígia Sousa, Dias Macedo (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 585 days.

(21) Appl. No.: 13/018,737

(22) Filed: Feb. 1, 2011

(65) Prior Publication Data

US 2012/0002743 A1     Jan. 5, 2012

Related U.S. Application Data

(60) Provisional application No. 61/360,149, filed on Jun. 30, 2010.

(51) Int. Cl.
*H04B 7/02*     (2006.01)
*H04L 1/02*     (2006.01)
(Continued)

(52) U.S. Cl.
CPC .............. *H04B 7/024* (2013.01); *H04B 7/0452* (2013.01); *H04B 7/0626* (2013.01);
(Continued)

(58) Field of Classification Search
USPC .......... 370/252, 328, 334, 350; 375/233, 260, 375/267, 316, 330; 455/67.11, 500, 501, 455/522
See application file for complete search history.

(56) References Cited

U.S. PATENT DOCUMENTS 7,158,804 B2 *    1/2007    Kumaran et al. ............. 455/515
7,688,709 B2 *    3/2010    Visuri et al. .................. 370/203
(Continued)

OTHER PUBLICATIONS

Ramy H. Gohary and Timothy N. Davidson, "On Rate-Optimal MIMO Signalling with Meant and Covariance Feedback," Feb. 2009, IEEE Transactions on Wireless Communications, vol. 8, No. 2, pp. 912-920.*

(Continued)

*Primary Examiner* — Daniel Washburn
*Assistant Examiner* — Amneet Singh
(74) *Attorney, Agent, or Firm* — Coats & Bennett, P.L.L.C.

(57) ABSTRACT

A network node jointly precodes multi-user (MU) multiple-input multiple-output (MIMO) transmissions simultaneously sent from geographically distributed base stations to a plurality of mobile terminals over associated downlink MU-MIMO channels. The node receives feedback that describes statistics of the downlink MU-MIMO channels, including channel mean and covariance. The node then computes, based on the channel means and covariances, uplink input covariances for the mobile terminals that would collectively maximize a first or second-order approximation of the ergodic capacity of dual uplink MU-MIMO channels, subject to a global transmit power constraint that comprises the sum of individual transmit power constraints for the base stations. Notably, the node adjusts the uplink input covariances as needed to satisfy the individual transmit power constraints for the base stations, maps the uplink input covariances to corresponding downlink input covariances, and jointly precodes MU-MIMO transmissions sent over the downlink MU-MIMO channels based on those downlink input covariances.

16 Claims, 7 Drawing Sheets

(51) Int. Cl.
- H04B 7/04 (2006.01)
- H04B 7/06 (2006.01)
- H04L 25/02 (2006.01)
- H04L 25/03 (2006.01)
- H04L 27/26 (2006.01)
- H04W 52/14 (2009.01)
- H04W 52/40 (2009.01)

(52) U.S. Cl.
CPC ..... H04L 25/0242 (2013.01); H04L 25/03343 (2013.01); H04L 27/2647 (2013.01); *H04B 7/0417* (2013.01); *H04W 52/143* (2013.01); *H04W 52/40* (2013.01); *H04B 7/0465* (2013.01)
USPC ........... 375/267; 375/233; 375/260; 375/316; 375/330; 370/252; 370/328; 370/334; 370/350; 455/67.11; 455/500; 455/501; 455/522

(56) References Cited

U.S. PATENT DOCUMENTS

| | | | |
|---|---|---|---|
| 2003/0147476 A1* | 8/2003 | Ma et al. | 375/329 |
| 2007/0191066 A1* | 8/2007 | Khojastepour et al. | 455/562.1 |
| 2008/0219369 A1* | 9/2008 | Wu et al. | 375/260 |
| 2008/0225960 A1* | 9/2008 | Kotecha et al. | 375/259 |
| 2008/0273618 A1* | 11/2008 | Forenza et al. | 375/261 |
| 2008/0310523 A1* | 12/2008 | Hui et al. | 375/260 |
| 2009/0117911 A1* | 5/2009 | Molisch et al. | 455/450 |
| 2009/0147728 A1* | 6/2009 | Atia et al. | 370/321 |
| 2010/0232553 A1* | 9/2010 | Gomadam et al. | 375/346 |
| 2010/0234053 A1* | 9/2010 | Zangi et al. | 455/501 |
| 2010/0272218 A1* | 10/2010 | Yeh et al. | 375/330 |
| 2010/0296591 A1* | 11/2010 | Xu et al. | 375/259 |
| 2010/0317355 A1* | 12/2010 | Zangi et al. | 455/450 |
| 2010/0322090 A1* | 12/2010 | Zhang et al. | 370/252 |
| 2010/0322176 A1* | 12/2010 | Chen et al. | 370/329 |
| 2010/0322351 A1* | 12/2010 | Tang et al. | 375/316 |
| 2010/0329190 A1* | 12/2010 | Miao et al. | 370/328 |
| 2011/0003608 A1* | 1/2011 | Forenza et al. | 455/501 |
| 2011/0058598 A1* | 3/2011 | Gaur | 375/233 |
| 2011/0194540 A1* | 8/2011 | Baligh et al. | 370/337 |
| 2011/0256901 A1* | 10/2011 | Guey | 455/522 |
| 2011/0268224 A1* | 11/2011 | Khojastepour | 375/295 |
| 2011/0286341 A1* | 11/2011 | Sanayei et al. | 370/252 |
| 2012/0028665 A1* | 2/2012 | Kwon et al. | 455/501 |
| 2012/0087335 A1* | 4/2012 | Baligh et al. | 370/330 |
| 2012/0113897 A1* | 5/2012 | Thiele et al. | 370/328 |

OTHER PUBLICATIONS

Pete He and Lian Zhao, "Improved Sum POwer Iterative Water-Filling with Rapid Convergence and Robustness for Multi-Antenna Gaussian Broadcast Channels," May 16-19, 2010, Vehicular Technology Conference (VTC 2010-Spring), 2010 IEEE 71$^{st}$, pp. 1-5.*
Wibowo Hardjawana, Branka Vucetic, and Yonghui Li, "Multi-User Cooperative Base Station System With Joint Precoding and Beamforming," Dec. 2009, IEEE Journal of Selected Topics in Signal Processing, vol. 3, No. 6, pp. 1079-1093.*
Ramy H. Gohary and Timothy N. Davidson, "On Rate-Optimal MIMO Signalling with Mean and Covariance Feedback," Feb. 2009, IEEE Transactions on Wireless Communications, vol. 8, No. 2, pp. 912-920.*
Pete He and Lian Zhao, "Improved Sum Power Iterative Water-Filling with Rapid Convergence and Robustness for Multi-Antenna Gaussian Broadcast Channels," May 16-19, 2010, Vehicular Technology Conference (VTC 2010-Spring), 2010 IEEE 71st, pp. 1-5.*
Alkan Soyal and Sennur Ulukus, "Optimim Power Allocation for Single-User MIMO and Multi-User MIMO-MAC with Partial CSI," Sep. 2007, IEEE Transactions on Wireless Communications, vol. 25, No. 7, pp. 1402-1412.*
W. Hardjawana, B. Vucetic, and Y. Li, "Multi-user cooperative base station systems with joint precoding and beamforming," IEEE Journal of Selected Topics in Signal Processing, vol. 3, No. 6, Dec. 2009.*

Wei Yu, Wonjong Rhee, Stephen Boyd, and John M. Cioffi, "Iterative Water-Filling for Gaussian Vector Multi-Access Channels," Jan. 2004, IEEE Transactions on Information Theory, vol. 50, No. 1, pp. 145-152.*
Siriram Vishwanath, Nihar Jindal, and Andrea Goldsmith, "Duality, Achievable Rates, and Sum-Rate Capacity of Gaussian MIMO Broadcast Channels," Oct. 2003,IEEE Transactions on Information Theory, vol. 49, No. 10, pp. 2658-2668.*
Feng Teng and Kamran Kiasaleh, "A Joint Precoding and Scheduling Technique for Multiuser MIMO Systems," 2005, IEEE. pp. 1-5.*
Wei Yu, "Uplink-Downlink Duality Via Minimax Duality," Feb. 2006,IEEE Transactions on Information Theory, vol. 52, No. 2, pp. 361-374.*
Mari Kobayashi and Giuseppe Caire, "An Iterative Water-Filling Algorithm for Maximum Weighted Sum-Rate of Gaussian MIMO-BC," Aug. 2006, IEEE Journal on Selected Areas in Communications, vol. 24, No. 8, pp. 1640-1646.*
Taesang Yoo and Andrea Goldsmith, "Capacity and Power Allocation for Fading MIMO Channels With Channel Estimation Error," May 2005,IEEE Transactions on Information Theory, vol. 52, No. 5, pp. 2203-2214.*
Alkan Soyal and Sennur Ulukus, "Optimality of Beamforming in Fading MIMO Multiple Access Channels," Apr. 2009, IEEE Transactions on Communications, vol. 57, No. 4, pp. 1171-1183.*
Yindi Jing and Hamid Jafarkhani, "Network Beamforming with Channel MEans and Covariances at Relays," 2008, IEEE, pp. 3743-3747.*
Nihar Jindal, Wonjong Rhee, Sriram Vishwanath, Syed Ali Jafar, and Andrea Goldsmith, "Sum POwer Iterative Water-Filling for Multi-Antenna Gaussian Broadcast Channels" Apr. 2005, IEEE Transactions on Information Theory, vol. 51, No. 4, pp. 1570-1580.*
Bandemer et al., "Capacity-Based Uplink Scheduling Using Long-Term Channel Knowledge," Proceedings of the 2007 IEEE International Conference on Communications (ICC 2007), Jun. 24, 2007, pp. 785-790.
He et al., "Improved Sum Power Iterative Water-Filling with Rapid Convergence and Robustness for Multi-Antenna Gaussian Broadcast Channels," IEEE Vehicular Technology Conference (VTC 2010 Spring), May 16-19, 2010, pp. 1-5, IEEE, Taipei, Taiwan.
Jafar et al., "Channel Capacity and Beamforming for Multiple Transmit and Receive Antennas with Covariance Feedback," IEEE International Conference on Communications, Jun. 11-14, 2001, pp. 2266-2270, vol. 7, Helsinki, Finland.
Kobayashi et al., "An Interative Water-Filling Algorithm for Maximum Weighted Sum-Rate of Gaussian MIMO-BC" IEEE Journal on Selected Areas in Communications, Aug. 2006, pp. 1640-1646, vol. 24, No. 8.
Soysal et al., "Optimum Power Allocation for Single-User MIMO and Multi-User MIMO-MAC with Partial CSI," IEEE Journal on Selected Areas in Communications, Sep. 2007, pp. 1402-1412, vol. 25, No. 7.
Xu et al., "Joint Optimization for Source and Relay Precoding under Multiuser MIMO Downlink Channels," IEEE International Conference on Communications (ICC 2010), May 23, 2010, pp. 1-5.
Dartmann, G. et al. "Jointly Optimized Transmit Beamforming and Temporal User Scheduling in Multiuser Multicell Scenarios Based on Correlation Knowledge." 33rd IEEE Sarnoff Symposium, Princeton, USA, Apr. 2010.
Fu, Y. et al. "Precoding for Multiuser Orthogonal Space-Time Block-Coded OFDM: Mean or Covariance Feedback?" IEEE International Conference on Communications (ICC '07), Glasgow, Jun. 24-28, 2007.
Jindal, N. et al. "Dirty-Paper Coding Versus TDMA for MIMO Broadcast Channels." IEEE Transactions on Information Theory, vol. 51, No. 5, May 2005.
Jindal, N. et al. "Sum Power Iterative Water-Filling for Multi-Antenna Gaussian Broadcast Channels." IEEE Transactions on Information Theory, vol. 51, No. 4, Apr. 2005.
Vishwanath, S. et al. "Duality, Achievable Rates, and Sum-Rate Capacity of Gaussian MIMO Broadcast Channels." IEEE Transactions on Information Theory, vol. 49, No. 10, Oct. 2003.
Yu, W. et al. "Iterative Water-Filling for Gaussian Vector Multiple-Access Channels." IEEE Transactions on Information Theory, vol. 50, No. 1, Jan. 2004.

* cited by examiner (DIVERGENT SCENARIO δ=140)

(CONVERGENT SCENARIO δ=200)

US 8,934,557 B2

STATISTICAL JOINT PRECODING IN MULTI-CELL, MULTI-USER MIMO

RELATED APPLICATIONS

This application claims priority to U.S. Provisional Patent Application Ser. No. 61/360,149, titled "Statistical Precoder Design for Coordinated Wireless Systems," filed Jun. 30, 2010, which is incorporated herein by reference in its entirety.

TECHNICAL FIELD

The present invention relates generally to wireless communication systems, and particularly to using statistical channel feedback to jointly precode downlink transmissions in a coordinated multi-point (CoMP) multi-user (MU) multiple-input multiple-output (MIMO) system.

BACKGROUND

In a multi-user (MU) multiple-input multiple-output (MIMO) system, a base station with multiple transmit antennas simultaneously sends different information streams to different mobile terminals, each with one or more receive antennas. The base station aims to orthogonalize the different information streams, and thus reduce interference among them, by precoding the downlink MU-MIMO transmission. In order to determine a precoding that accounts for the downlink MU-MIMO channel conditions, the base station must receive timely channel state information (CSI) feedback from the mobile terminals.

Because the uplink bandwidth for feedback is limited, the mobile terminals typically only feed back partial CSI. In one approach, each mobile terminal feeds back quantized channel coefficients. In another approach, each mobile terminal feeds back information that merely describes channel statistics. Most implementations of the latter approach further limit feedback to either the channel mean or the channel covariance. The few implementations that feed back comprehensive statistical information, feeding back both the channel mean and covariance, are prohibitively complex in practice.

This remains especially true in a coordinated multi-point (CoMP) (i.e., multi-cell) context, which presents additional complexities. In a centralized CoMP architecture, geographically distributed base stations connect to a CoMP controller. The CoMP controller jointly precodes MU-MIMO transmissions simultaneously sent from the base stations to mobile terminals. This joint precoding certainly increases achievable rates, but the accompanying increase in complexity has nonetheless prohibited known joint precoding approaches from reaching the maximum rates theoretically possible.

SUMMARY

Teachings herein advantageously utilize comprehensive statistical channel feedback in joint precoding of downlink MU-MIMO transmissions in order to maximize the capacity of a CoMP MU-MIMO system. The teachings notably account for realistic constraints on uplink bandwidth for channel feedback and on individualized base station transmit power, while still exploiting duality between downlink MU-MIMO channels and corresponding uplink MU-MIMO channels.

More particularly, a CoMP MU-MIMO system herein includes geographically distributed base stations that jointly serve a plurality of mobile terminals via simultaneous MU-MIMO transmissions sent over downlink MU-MIMO channels. A network node in the system (e.g., a centralized CoMP controller or one of the base stations) jointly precodes the MU-MIMO transmissions in order to reduce interference among them. In some embodiments, for example, the network node dirty paper codes the MU-MIMO transmissions. Regardless, this joint precoding is dictated by downlink input covariances for the mobile terminals. To determine the optimal joint precoding that maximizes the capacity of the downlink MU-MIMO channels, therefore, the network node determines the correspondingly optimal downlink input covariances.

The network node indirectly determines these optimal downlink input covariances by relying a duality between the downlink MU-MIMO channels and corresponding uplink MU-MIMO channels. Under this duality, the (non-convex) capacity region of the downlink MU-MIMO channels equals the (convex) capacity region of the dual uplink MU-MIMO channels. Thus, the network node determines the uplink input covariances that would maximize the capacity of the uplink MU-MIMO channels, e.g., using convex optimization techniques, and then maps those optimal uplink input covariances into correspondingly optimal downlink input covariances.

To this end, the network node includes a communications interface, a computation circuit, an adjustment circuit, a mapping circuit, and a joint precoding circuit. The communications interface receives feedback that describes statistics of the downlink MU-MIMO channels. These statistics are comprehensive in the sense that they include both channel mean and covariance.

The computation circuit compute, based on the received channel means and covariances, uplink input covariances for the mobile terminals. The circuit specifically computes uplink input covariances that would collectively maximize a first or second-order approximation of the capacity of the dual uplink MU-MIMO channels, subject to a global transmit power constraint. This global transmit power constraint comprises the sum of individual transmit power constraints for the base stations.

Although the uplink input covariances are initially computed based on the global transmit power constraint, the adjustment circuit adjusts the uplink input covariances as needed to satisfy the individual transmit power constraints for the base stations. In some embodiments, for example, this adjustment entails allocating full transmit power to one of the base station and allocating transmit powers to the other base stations that are less than their respective individual transmit power constraints.

With the uplink input covariances now accounting for the individual transmit power constraints imposed on the base stations, the mapping circuit maps the uplink input covariances to corresponding downlink input covariances. The joint precoding circuit then jointly precodes the MU-MIMO transmissions sent over the downlink MU-MIMO channels based on these downlink input covariances.

Jointly precoding the MU-MIMO transmissions this way, the network node improves the ergodic sum rate of the system as compared to known joint precoding approaches, while at the same time maintaining reasonable uplink bandwidth requirements and processing complexities. The particular extent of sum rate improvements may nonetheless depend on the degree of processing complexities involved in the joint precoding. In this regard, the network node in some embodiments is configured to dynamically adjust the processing complexities of joint precoding depending on whether or not additional processing complexities would yield non-trivial sum rate improvements. In at least one embodiment, for example, the network node computes uplink input covariances that would collectively maximize either the first or second-order approximation depending on whether the global transmit power constraint is less than or greater than, respectively, a pre-determined global transmit power level.

In many embodiments, the network node computes the uplink input covariances using an iterative convex optimization process. This iterative process continues until the process ultimately converges to the maximum of the first or second-order approximation, or to within a pre-determined margin of error thereof. The network node may set a convergence parameter that governs the speed of this convergence. In some embodiments, the network node actually stores different candidate convergence parameter values in memory, each candidate value having been empirically determined as optimal for different global transmit power constraint levels. The network node correspondingly selects from these candidate convergence parameter values based on the actual global transmit power constraint.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
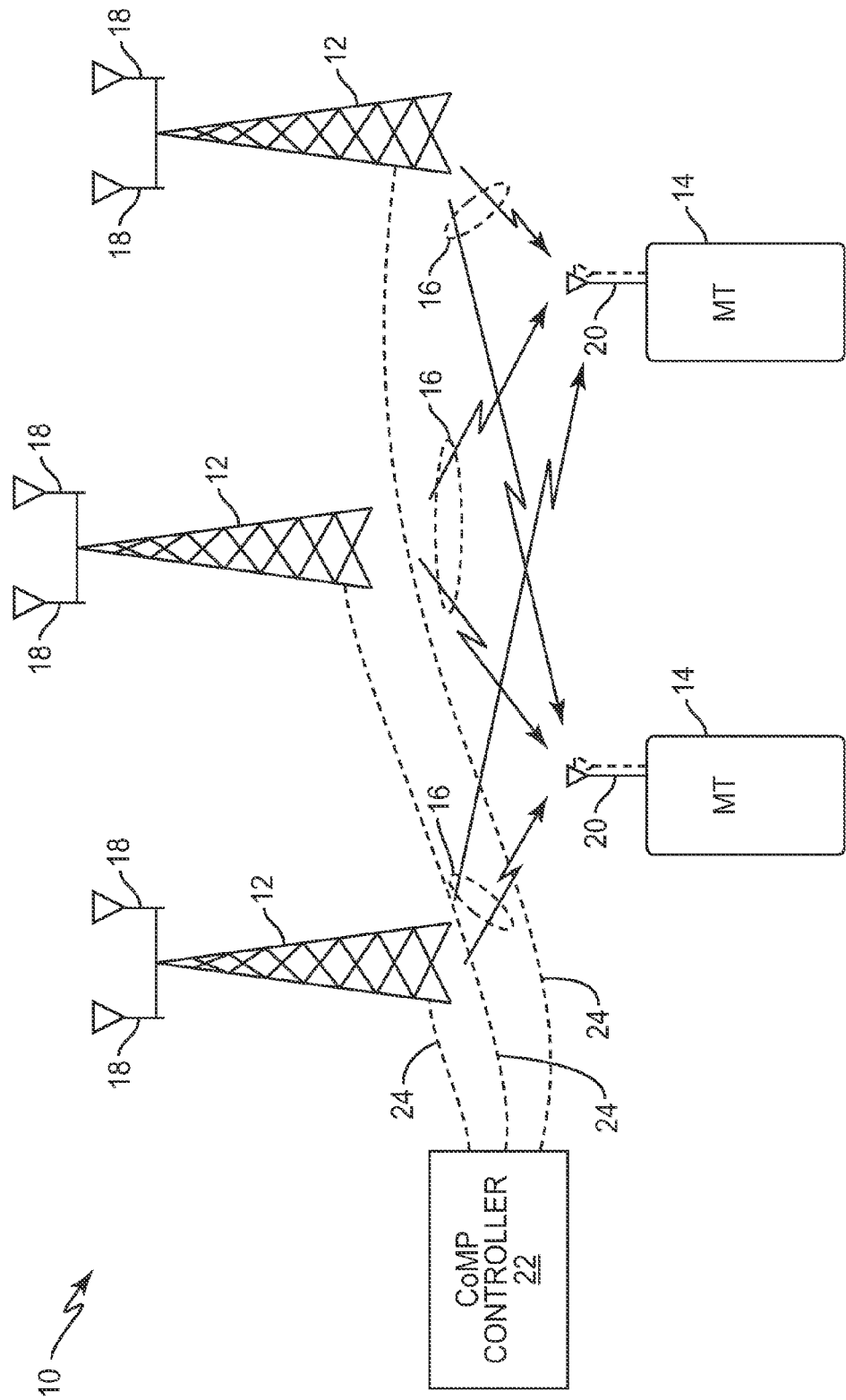
FIG. 1 is a block diagram of a wireless communication system according to one or more embodiments.

FIG. 1 illustrates a coordinated multi-point (CoMP) multi-user (MU) multiple-input multiple-output (MIMO) system 10. The system 10 includes geographically distributed base stations 12 that jointly serve a plurality of mobile terminals 14 via simultaneous MU-MIMO transmissions 16. Each base station 12 sends one of these MU-MIMO transmissions 16 over an associated downlink MU-MIMO channel using multiple transmit antennas 18. Correspondingly, each mobile terminal 14 receives each MU-MIMO transmission 16 using one or more receive antennas 20.

A centralized CoMP controller 22 connected to the base stations 12, e.g., via fast backhaul communication links 24, jointly precodes the MU-MIMO transmissions 16 in order to reduce interference among them. In some embodiments, for example, the CoMP controller 22 dirty paper codes the MU-MIMO transmissions 16 and thereby pre-subtracts known interference before transmission.

Regardless of the particular joint precoding strategy, the joint precoding is dictated by the downlink input covariances for the mobile terminals 14. The downlink input covariances describe the covariances of respective signals intended for the terminals 14, as shaped by encoding and input into the joint precoding circuit of the CoMP controller 22. Accordingly, to determine the optimal joint precoding, the CoMP controller 22 determines the correspondingly optimal downlink input covariances. Here, optimal refers to the joint precoding and corresponding downlink input covariances that maximize the capacity of the downlink MU-MIMO channels.

Direct determination of the optimal downlink input covariances, however, proves prohibitively complex. The complexities arise primarily because the capacity region of the downlink MU-MIMO channels (defining the set of all rate vectors simultaneously achievable by the terminals 14) leads to non-convex functions of the downlink input covariances. To avoid these complexities, the CoMP controller 22 indirectly determines the optimal downlink input covariances by relying on a duality between the downlink MU-MIMO channels and corresponding uplink MU-MIMO channels. Under this duality, the (non-convex) capacity region of the downlink MU-MIMO channels equals the (convex) capacity region of the dual uplink MU-MIMO channels. Thus, the CoMP controller 22 determines the uplink input covariances that maximize the capacity of the uplink MU-MIMO channels, e.g., using convex optimization techniques, and then maps those optimal uplink input covariances into correspondingly optimal downlink input covariances.

Notably, in determining the optimal uplink input covariances, the CoMP controller 22 accounts for realistic constraints on the uplink bandwidth for channel feedback and on the base stations' transmit powers. As explained more fully below, the CoMP controller 22 determines the uplink input covariances based on limited channel feedback that merely describes statistics of the downlink MU-MIMO channels. Furthermore, while the CoMP controller 22 initially determines the uplink input covariances subject to a theoretical, global transmit power constraint pooled across base stations 12 (in order for duality to hold), the CoMP controller 22 thereafter adjusts the uplink input covariances to satisfy the actual, individual transmit power constraints imposed on each base station 12. Illustrating additional details in this regard, FIG. 2 shows the CoMP controller 22 according to various embodiments herein.

Figure 2:
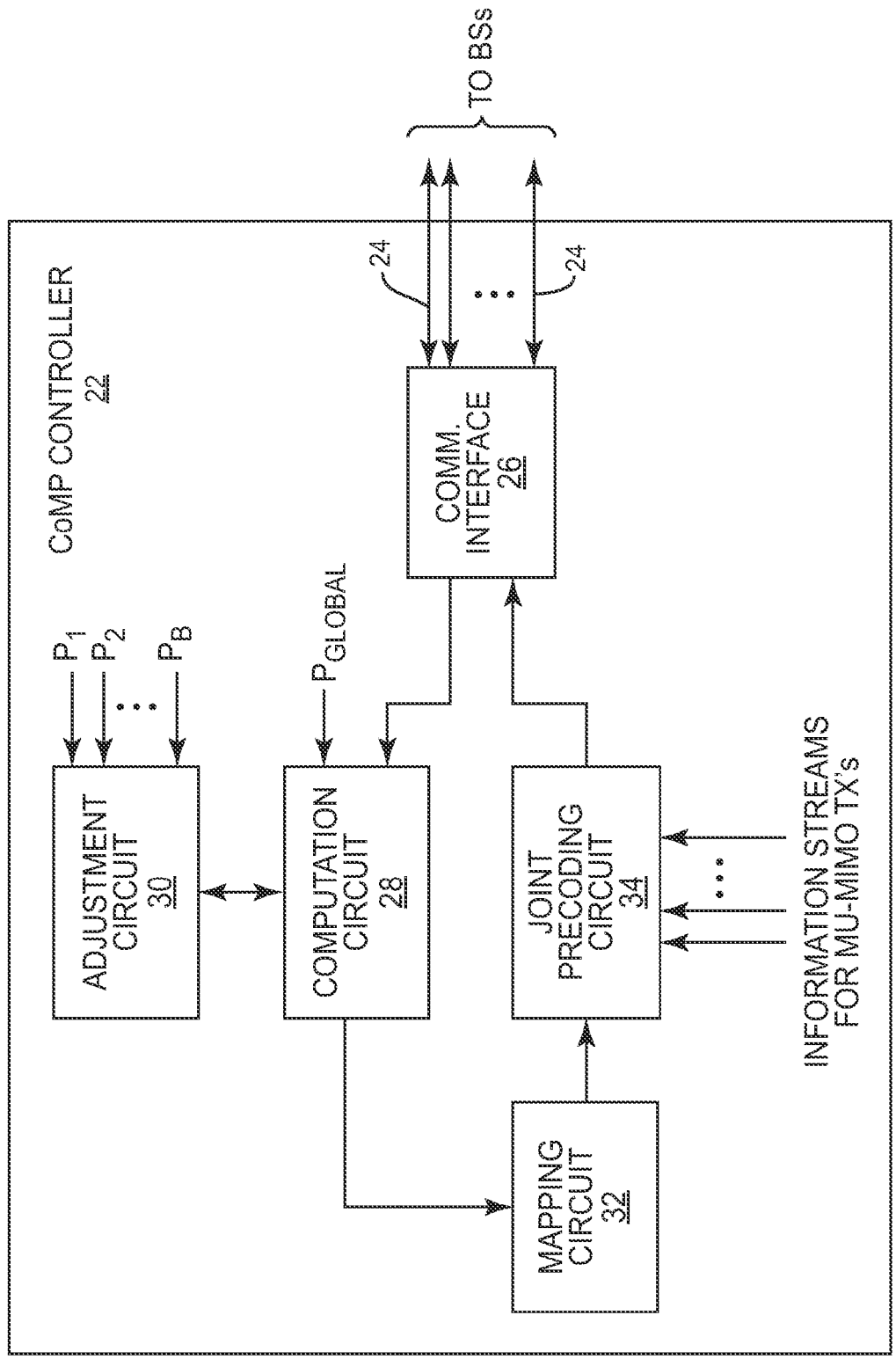
FIG. 2 is a block diagram of a coordinated multi-point (CoMP) controller according to one or more embodiments.

In FIG. 2, the CoMP controller 22 includes a communications interface 26, a computation circuit 28, an adjustment circuit 30, a mapping circuit 32, and a joint precoding circuit 34. The communications interface 26 communicatively couples the CoMP controller 22 to the base stations 12 via the fast backhaul communication links 24 and receives feedback that describes statistics of the downlink MU-MIMO channels. These statistics are comprehensive in the sense that they include both channel mean and covariance.

The computation circuit 28 is configured to compute, based on the received channel means and covariances, uplink input covariances for the mobile terminals 14. The circuit 28 specifically computes uplink input covariances that would collectively maximize a first or second-order approximation of the capacity of the dual uplink MU-MIMO channels, subject to a global transmit power constraint $P_{global}$. This global transmit power constraint $P_{global}$ comprises the sum of individual transmit power constraints $P_1, P_2, \ldots P_B$ for the base stations 12, where B represents the number of base stations 12 connected to the CoMP controller 22.

Although the uplink input covariances are initially computed based on the global transmit power constraint $P_{global}$, the adjustment circuit 30 adjusts the uplink input covariances as needed to satisfy the individual transmit power constraints $P_1, P_2, \ldots P_B$ for the base stations 12. In some embodiments, for example, this adjustment entails allocating full transmit power to one of the base station 12 and allocating transmit powers to the other base stations 12 that are less than their respective individual transmit power constraints.

With the uplink input covariances now accounting for the individual transmit power constraints $P_1, P_2, \ldots P_B$ imposed on the base stations 12, the mapping circuit 32 maps the uplink input covariances to corresponding downlink input covariances. The joint precoding circuit 34 then jointly precodes the MU-MIMO transmissions 16 sent over the downlink MU-MIMO channels based on these downlink input covariances.

Jointly precoding the MU-MIMO transmissions 16 this way, the CoMP controller 22 improves the ergodic sum rate of the system 10 as compared to known joint precoding approaches, while at the same time maintaining reasonable uplink bandwidth requirements and processing complexities. The particular extent of sum rate improvements may nonetheless depend on the degree of processing complexities involved in the joint precoding. In this regard, the CoMP controller 22 in some embodiments is configured to dynamically adjust the processing complexities of joint precoding depending on whether or not additional processing complexities would yield non-trivial sum rate improvements. Consider, for example, FIGS. 3A-3B.

Figure 3A:
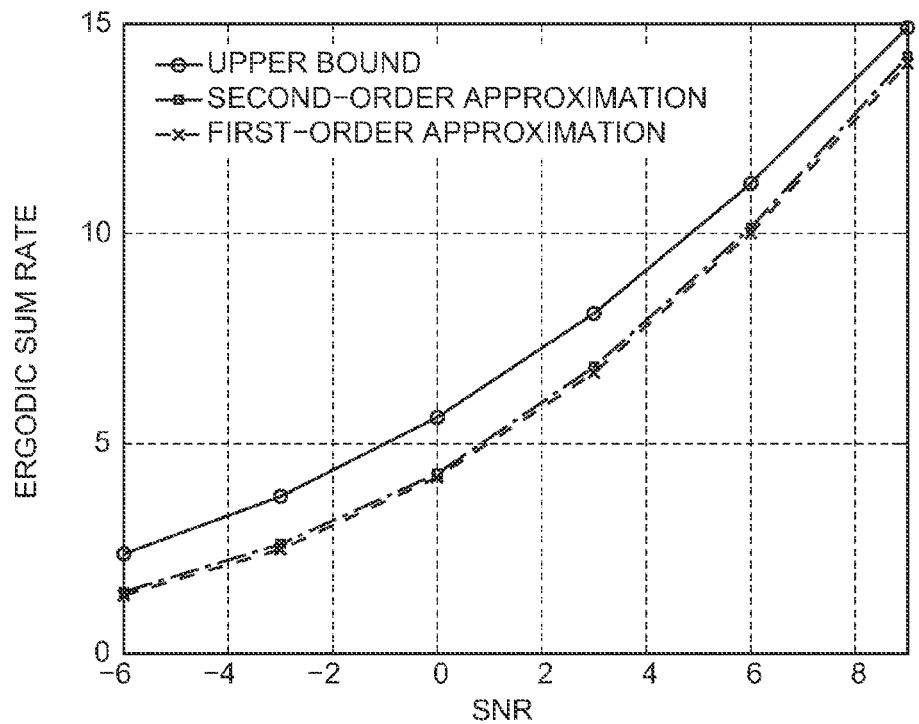
FIGS. 3A-3B are graphs that compare the expected sum rate improvements attained with different embodiments herein, namely embodiments using a first order approximation and embodiments using a second order approximation.
Figure 3B:
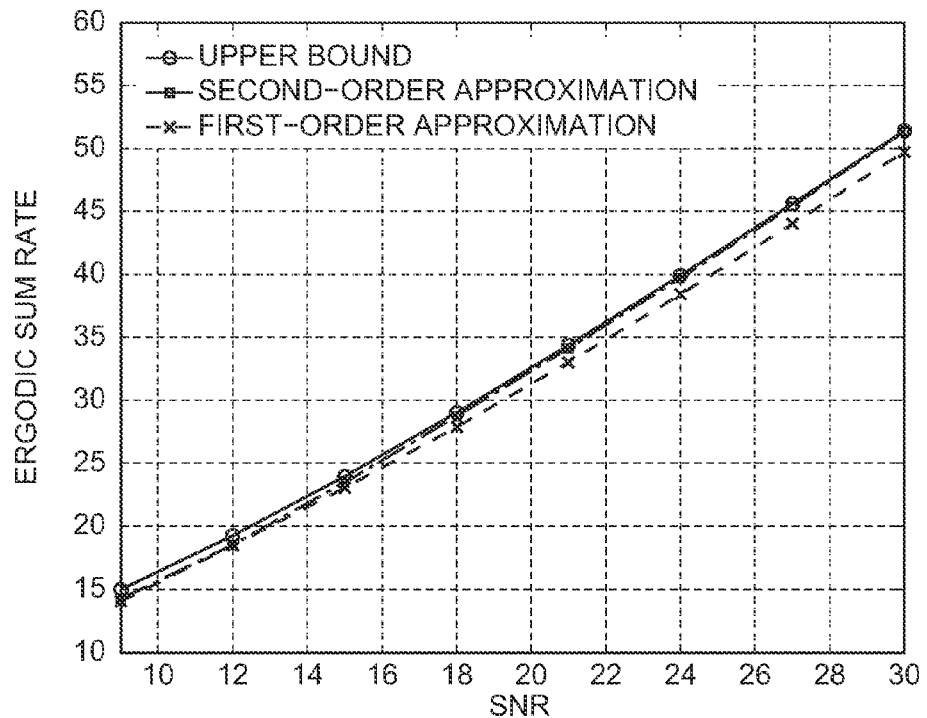

FIGS. 3A-3B compare the expected sum rate improvements attained by using the relatively less complex first order approximation of the capacity of the dual uplink MU-MIMO channels, and the relatively more complex second-order approximation, under different signal-to-noise ratio (SNR) scenarios. Here, SNR comprises the average SNR at each terminal 14, and therefore comprises $$\frac{P_{global}}{N},$$

where N represents the average noise power at each terminal 14. FIG. 3A shows that for SNRs below a certain level, using the second-order approximation yields only trivial sum rate improvements as compared to the first order approximation, despite adding non-trivial processing complexities to joint precoding. By contrast, FIG. 3B shows that for SNRs above a certain level, using the second-order approximation yields sum rate improvements that actually approach the sum rate's upper bound.

Accordingly, the CoMP controller 22 in one or more embodiments is configured to dynamically switch between using a first or second-order approximation depending on the SNR scenario. For SNRs below a pre-determined level, the CoMP controller 22 uses the first order approximation to decrease processing complexities while yielding sum rate improvements comparable to the second-order approximation. For SNRs above the pre-determined level, by contrast, the CoMP controller 22 uses the second-order approximation to yield sum rate improvements not attainable without adding associated processing complexities.

Assuming the noise power N is normalized to unity, the SNR simply comprises the global transmit power constraint $P_{global}$. Thus, in one or more embodiments, the CoMP controller 22 (in particular, the computation circuit 28) is configured to compute uplink input covariances that would collectively maximize either the first or second-order approximation depending on whether the global transmit power constraint $P_{global}$ is less than or greater than, respectively, a pre-determined global transmit power level.

Regardless of whether or not the CoMP controller 22 dynamically switches between using the first and second-order approximations, the CoMP controller 22 in many embodiments is configured to compute the uplink input covariances using an iterative convex optimization process. In particular, the computation circuit 28 in these embodiments is configured to initialize the uplink input covariances and then collectively update them during each iteration of an iterative convex optimization process that maximizes the first or second-order approximation, subject to the global transmit power constraint $P_{global}$. During any given iteration, the computation circuit 28 updates the uplink input covariances as a function of uplink input covariances computed in a previous iteration. This iterative process continues until the process ultimately converges to the maximum of the first or second-order approximation, or to within a pre-determined margin of error thereof.

In some embodiments, the computation circuit 28 sets a convergence parameter δ that governs the speed of this convergence. Then, at each iteration, the circuit 28 evaluates the first or second-order approximation as a function of the uplink input covariances updated during that iteration, and determines if the iterative process has converged in accordance with the set convergence parameter δ. If the process has not yet converged, the circuit 28 performs a subsequent iteration.

Figure 4A:
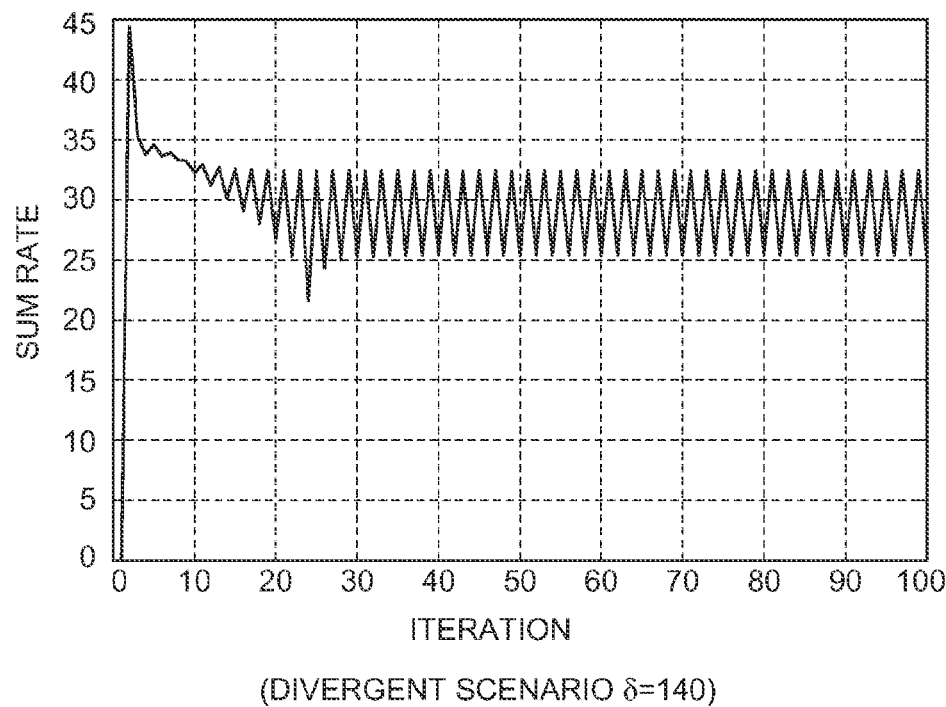
FIGS. 4A-4B are graphs that compare convergence criteria for different values of a convergence parameter according to various embodiments.
Figure 4B:
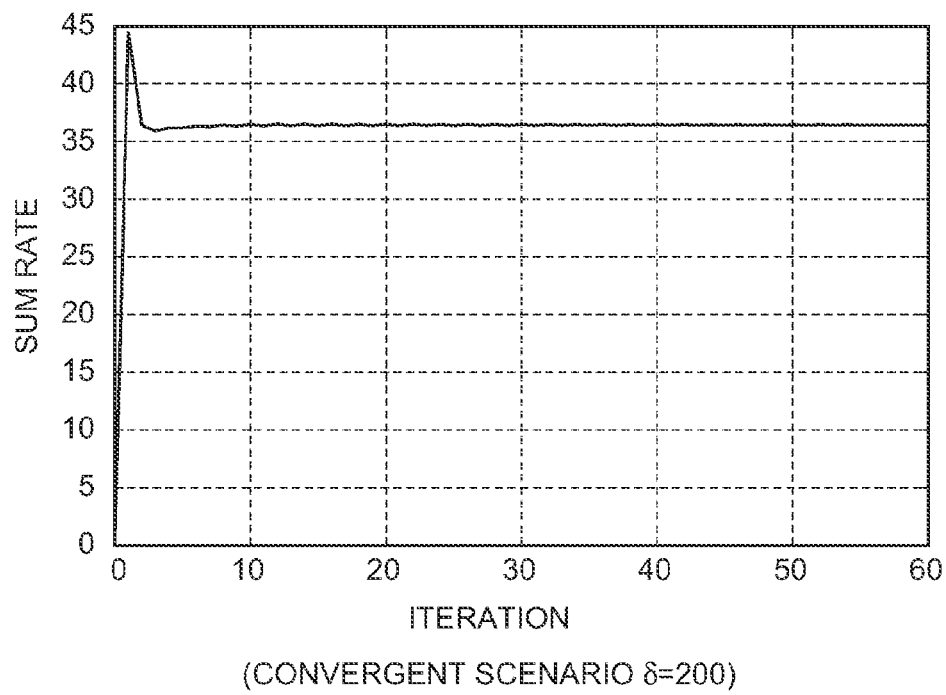

The particular value to which the computation circuit 28 sets the convergence parameter δ may vary dynamically depending on the SNR at the terminals 14. Indeed, a convergence parameter δ set to any given value may ensure quick convergence for some SNRs, but not others. Consider, for example, FIGS. 4A-4B, which illustrate simulated iteration results for an SNR of 15 dB. In FIG. 4A, a convergence parameter δ with a scalar value of 140 fails to provide converge after 100 iterations. By contrast, in FIG. 4B, a convergence parameter δ with a scalar value of 200 provides converges after approximately 60 iterations.

Accordingly, in some embodiments, different candidate convergence parameter values ensuring quick convergence for different discrete SNR values or ranges are empirically determined based on simulations. These candidate convergence parameter values are stored in memory (not shown) at the CoMP controller 22, and mapped to their corresponding SNR values or ranges. The computation circuit 28 then sets the convergence parameter δ by selecting from the candidate convergence parameter values the value that is mapped to the current SNR.

Again assuming the noise power N is normalized to unity, the SNR simply comprises the global transmit power constraint $P_{global}$. Thus, in one or more embodiments, the candidate convergence parameter values are mapped in memory to corresponding global transmit power constraint levels or ranges. The computation circuit 28 correspondingly selects from the candidate convergence parameter values based on the global transmit power constraint $P_{global}$.

Figure 5:
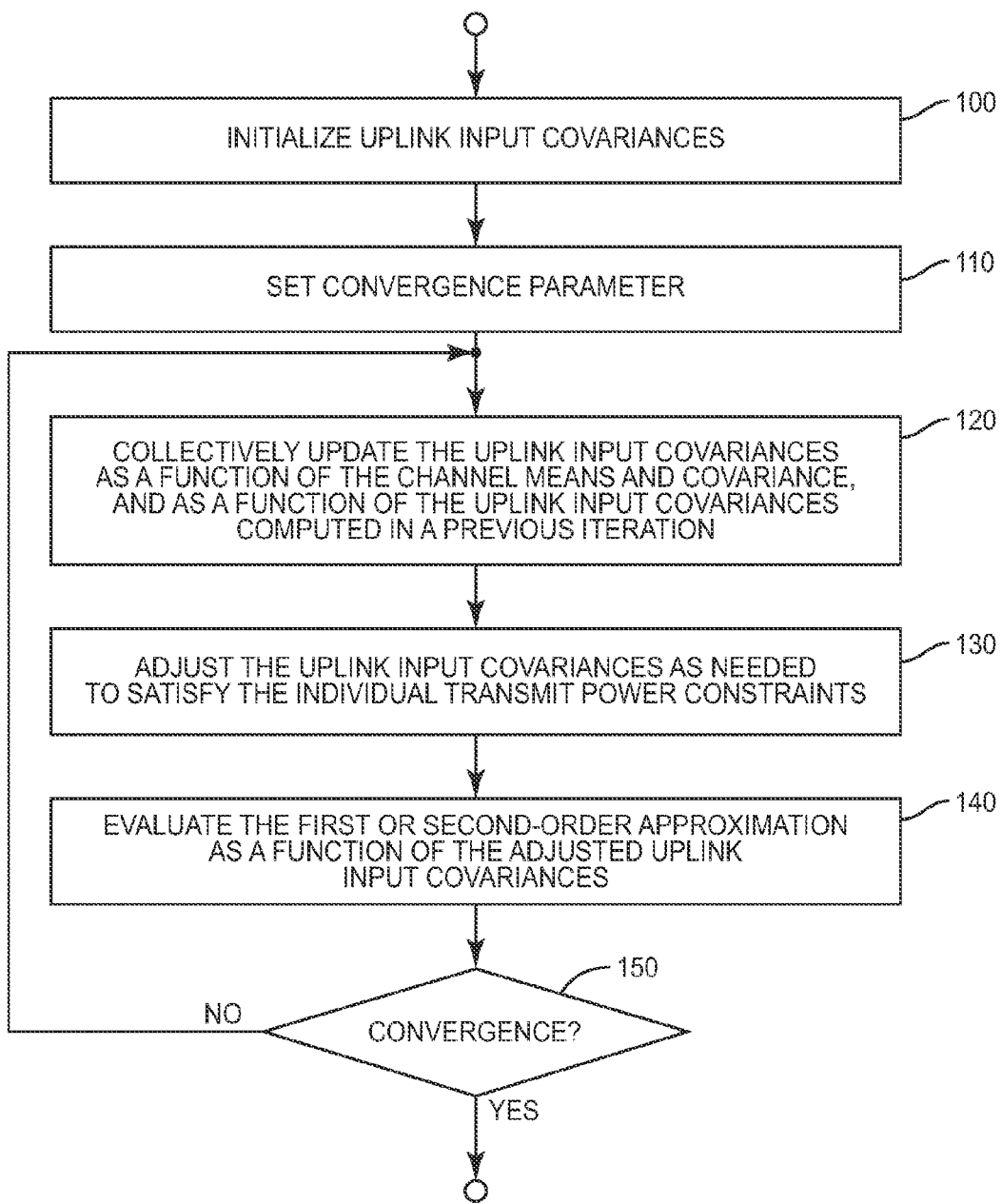
FIG. 5 is a logic flow diagram of an iterative convex optimization process for joint precoding according to one or more embodiments.

Irrespective of whether the computation circuit 28 dynamically sets the convergence parameter as described above, FIG. 5 illustrates cooperation between the computation circuit 28 and the adjustment circuit 30 during an iterative convex optimization process, according to one or more embodiments. In FIG. 5, the computation circuit 28 initializes the uplink input covariances (Block 100) and sets the convergence parameter δ (Block 110). Then, during any given iteration of the process, the computation circuit 28 collectively updates the uplink input covariances as a function of the channel means and covariances, and as a function of uplink input covariances computed in a previous iteration (Block 120). Although such updating is done subject to the global transmit power constraint $P_{global}$, the adjustment circuit 30 adjusts the uplink input covariances as needed to satisfy the individual transmit power constraints $P_1, P_2, \ldots P_B$ (Block 130). The computation circuit 28 then evaluates the first or second-order approximation as a function of these adjusted uplink input covariances (Block 140) in order to determine whether or not the process has converged. If the iterative process has not yet converged (NO at Block 150), the computation circuit 28 and adjustment circuit 30 perform another iteration. Otherwise (YES at Block 150), the iterative process ends before the mapping circuit 32 maps the obtained uplink input covariances to corresponding downlink input covariances.

In more detail, the system 10 in some embodiments has B base stations 12 and K mobile terminals 14. Each base station 12 has $N_t$ transmit antennas 18, and each mobile terminal 14 has $N_r$ receive antennas 20. Defining $H_{b,j}$ to be the downlink MIMO channel at any given time from base station b, for b=1, 2, ... B, to a specific mobile terminal j within j=1, 2, ... K mobile terminals, the composite downlink MIMO channel from all base stations to mobile terminal j is:

$$H_{\Sigma j} = [H_{1,j} H_{2,j} \ldots H_{B,j}]_{N_r \times BN_t} \quad (1)$$

Assuming this channel is frequency-flat and stationary, has Kronecker-structured covariances, and accounts for small-scale fading, it can be modeled as:

$$H_{\Sigma j} = \bar{H}_{\Sigma j} + R_{rj}^{1/2} H_w R_{tj}^{1/2}, \quad (2)$$

where $\bar{H}_{\Sigma j}$ is the channel mean for mobile terminal j, $R_{rj}^{1/2}$ is the receive covariance matrix for mobile terminal j, $R_{tj}^{1/2}$ is the transmit covariance matrix for mobile terminal j, and $H_w$ is the small-scale fading channel matrix.

Now define $x_j^{[b]}$ as the specific signal transmitted from base station b to mobile terminal j via any given downlink MU-MIMO transmission 16. Across all downlink MU-MIMO transmissions 16, therefore, the composite signal transmitted specifically to mobile terminal j is $x_j = [x_j^{[1]T} x_j^{[2]T} \ldots x_j^{[B]T}]^T$. Mobile terminal j receives this composite signal $x_j$, as well as the composite signals $x_k$ transmitted to other mobile terminals k, for k≠j, such that the signal $y_j$ received at mobile terminal j is $$y_j = H_{\Sigma j} x_j + \sum_{k \neq j} H_{\Sigma j} x_k + n_j, \quad (3)$$

where $n_j$ refers to a zero-mean, identity-covariance complex Gaussian noise.

In view of this, the CoMP controller 22 jointly precodes the downlink MU-MIMO transmissions 16 to reduce interference in $x_j$ attributable to $x_k$, for k≠j. Specifically, the CoMP controller 22 computes a joint precoding matrix $T=[T_1 T_2 \ldots T_K]$ that is applied across the data streams sent to the mobile terminals, where $T_k$ is the precoding matrix applied to the data streams sent to mobile terminal k. Assuming the data streams have independent and identically distributed, zero-mean, unit-variance, and complex Gaussian entries, the signal $y_j$ received at mobile terminal j can therefore be written as:

$$y_j = H_{\Sigma j} T s + n_j, \quad (4)$$

where $s = [s_1^T s_2^T \ldots s_K^T]^T$ represents the joint data stream vector and includes the data streams $s_k$ sent to each mobile terminal k.

This joint precoding matrix T is dictated by the downlink input covariances $\Sigma_1, \Sigma_2, \ldots \Sigma_K$ for the K mobile terminals. The CoMP controller 22 indirectly determines downlink input covariances $\Sigma_1, \Sigma_2, \ldots \Sigma_K$ by relying on a duality between the downlink MU-MIMO channels and corresponding uplink MU-MIMO channels. Under this duality, the sum rate capacity $C_{down}(H_{\Sigma 1}, \ldots, H_{\Sigma K}, P)$ of the downlink MU-MIMO channels equals the sum rate capacity $C_{up}(H_{\Sigma 1}^H, \ldots, H_{\Sigma K}^H, P)$ of the dual uplink MU-MIMO channels, subject to a sum power constraint P. The CoMP controller 22 thereby determines uplink input covariances $Q_1, Q_2, \ldots Q_K$ that would collectively maximize a first or second-order approximation of the capacity $C_{up}(H_{\Sigma 1}^H, \ldots, H_{\Sigma K}^H, P)$ of the uplink MU-MIMO channels, subject to a sum power constraint $P=P_{global}$, where $P_{global}$ equals the sum of the individual transmit power constraints $P_1, P_2, \ldots P_B$ imposed on the B base stations. The CoMP controller 22 then adjusts the uplink input covariances $Q_1, Q_2, \ldots Q_K$ as needed to satisfy the individual transmit power constraints $P_1, P_2, \ldots P_B$ for the base stations and maps those adjusted uplink input covariances $Q_1, Q_2, \ldots Q_K$ to corresponding downlink input covariances $\Sigma_1, \Sigma_2, \ldots E_K$.

In an ideal, yet unrealistic scenario, the CoMP controller 22 would have perfect channel state information and could determine the uplink input covariances $Q_1, Q_2, \ldots Q_K$ according to:

$$C_{up}(H_{\Sigma 1}^H, \ldots, H_{\Sigma K}^H, P) = \max_{\{Q_i\}_{i=1}^K; Q_i \geq 0, \sum_{i=1}^K Tr(Q_i) \leq P} \log|I + G_i^H Q_i G_i|, \quad (5)$$

where Tr {.} represents the trace operator and $G_i = H_{\Sigma i} C_i^{-1/2}$, with $C_i = (I + \sum_{j \neq i} H_{\Sigma j}^H Q_j H_{\Sigma j})$. However, as noted above, the CoMP controller 22 does not receive perfect channel state information; instead the CoMP controller practically receives statistical channel information, including the channel mean $\bar{H}_{\Sigma i}$, the receive covariance matrix $R_{ri}$, and the transmit covariance matrix $R_{ti}$ for each mobile terminal i.

Therefore, the CoMP controller 22 instead determines the uplink input covariances $Q_1, Q_2, \ldots Q_K$ according to the ergodic capacity given by:

$$\bar{C}_{up}(H_{\Sigma 1}^H, \ldots, H_{\Sigma K}^H, P) = \max_{\{Q_i\}_{i=1}^K; Q_i \geq 0, \sum_{i=1}^K Tr(Q_i) \leq P} E\{\log|I + G_i^H Q_i G_i|\}, \quad (6)$$

where E {.} represents the expectation operator. Approximating this capacity with a second-order Taylor series yields:

$$\bar{C}_{up}(H_{\Sigma 1}^H, \ldots, H_{\Sigma K}^H, P) = \max_{\{Q_i\}_{i=1}^K; Q_i \geq 0, \sum_{i=1}^K Tr(Q_i) \leq P} F(Q_i) \quad (7)$$

where

-continued $$F(Q_i) = E\{\log|I + C_i^{-1/2} H_{\Sigma i}^H Q_i H_{\Sigma i} C_i^{-1/2}|\}$$

$$= E\begin{Bmatrix} Tr(C_i^{-1/2} H_{\Sigma i}^H Q_i H_{\Sigma i} C_i^{-1/2}) - \\ \frac{1}{2} Tr(C_i^{-1/2} H_{\Sigma i}^H Q_i H_{\Sigma i} C_i^{-1/2})^2 \end{Bmatrix}$$

$$= E\{Tr(C_i^{-1/2} H_{\Sigma i}^H Q_i H_{\Sigma i} C_i^{-1/2})\} -$$
$$\frac{1}{2} E\{Tr(C_i^{-1/2} H_{\Sigma i}^H Q_i H_{\Sigma i} C_i^{-1/2})^2\}$$

The CoMP controller 22 in various embodiments thereby computes, based on the channel mean $\overline{H}_{\Sigma i}$, the receive covariance matrix $R_{ri}$, and the transmit covariance matrix $R_{ti}$ received for each mobile terminal i, the uplink input covariances $Q_1, Q_2, \ldots Q_K$ according to the channel model of equation (2) and the second-order Taylor series approximation of equation (7). Indeed, after substituting the channel model of equation (2) into equation (7) and performing various mathematical manipulations, $F(Q_i)$ above simplifies to:

$$F(Q_i) = Tr(X_i Q_i) - \frac{1}{2}\begin{pmatrix} Tr(R_{ti} C_i^{-1})^2 (Tr(R_{ri} Q_i))^2 + Tr(R_{ri} Q_i) \\ Tr(\overline{H}_{\Sigma i}^H Q_i \overline{H}_{\Sigma i} C_i^{-1} R_{ti} C_i^{-1}) + Tr(X_i Q_i)^2 \end{pmatrix} \quad (8)$$

where $X_i = (\overline{H}_{\Sigma i} C_i^{-1} \overline{H}_{\Sigma i}^H + Tr(R_{ti} C_i^{-1}) R_{ri})$.

The CoMP controller 22 may actually compute the uplink input covariances $Q_1, Q_2, \ldots Q_K$ according to the second-order Taylor series approximation of equation (7) or the simplified form of equation (8) using an iterative convex optimization process. In doing so, the CoMP controller 22 sets a convergence parameter $\delta$ that governs the speed of the iterative process's convergence according to:

$$F(Q_i) = \frac{1}{\delta+1} Tr(X_i Q_i) - $$
$$\frac{1}{2(\delta+1)^2}\begin{pmatrix} Tr(R_{ti} C_i^{-1})^2 (Tr(R_{ri} Q_i))^2 + Tr(R_{ri} Q_i) \\ Tr(\overline{H}_{\Sigma i}^H Q_i \overline{H}_{\Sigma i} C_i^{-1} R_{ti} C_i^{-1}) + Tr(X_i Q_i)^2 \end{pmatrix} \quad (9)$$

The CoMP controller 22 sets this convergence parameter $\delta$ to ensure convergence of the iterative process to the maximum of the second-order Taylor series approximation, or to within a pre-determined margin of error $\epsilon$ thereof. In one or more embodiments, for example, the CoMP controller 22 sets the convergence parameter $\delta$ large enough for convergence, but small enough for the convergence to occur at a rate that permits the first term in equation (9) (i.e., $Tr(X_i Q_i)$) to capture the dominant components of the approximation. As discussed above, the particular value to which the computation circuit 28 sets the convergence parameter $\delta$ for this to occur may vary dynamically depending on the SNR at the terminals 14.

In one or more embodiments, the CoMP controller 22 uses a Lagrangian optimization process to compute the uplink input covariances $Q_1, Q_2, \ldots Q_K$. In particular, the Lagrangian of equation (9) can be written as:

$$L(Q_i, Z_i, v) = -F(Q_i) - Tr(Z_i Q_i) + v\left(\sum_{i=1}^{K} Tr(Q_i) - P\right) \quad (10)$$

where $Z_i$ and v are dual variables of equation (10). The Karush-Kuhn-Tucker (KKT) conditions that guarantee optimality of equation (10) are:

$$\nabla_{Q_i} L = \quad (11)$$

$$0 \Rightarrow \frac{1}{2(\delta+1)^2}\begin{pmatrix} 2Tr(R_{ti} C_i^{-1})^2 Tr(R_{ri} Q_i) R_{ri} + \\ 2Tr(\overline{H}_{\Sigma i} C_i^{-1} R_{ti} C_i^{-1} \overline{H}_{\Sigma i}^H Q_i) R_{ri} + \\ 2Tr(R_{ri} Q_i) \overline{H}_{\Sigma i} C_i^{-1} R_{ti} C_i^{-1} \overline{H}_{\Sigma i}^H + 2X_i Q_i X_i \end{pmatrix} -$$

$$\frac{1}{\delta+1} X_i - Z_i + vI = 0$$

$$Q_i \succeq 0 \quad (12)$$

$$\nabla_{Z_i} L = 0 \Rightarrow Tr(Z_i Q_i) = 0 \quad (13)$$

$$Z_i \succeq 0 \quad (14)$$

$$\Delta_v L = 0 \Rightarrow \sum_{i=1}^{K} Tr(Q_i) - P = 0 \Rightarrow \sum_{i=1}^{K} Tr(Q_i) = P \quad (15)$$

Thus, assuming that the matrix $X_i$ is invertible, the uplink input covariance $Q_i^{(n)}$ for any given mobile terminal i that maximizes $F(Q_i)$ of equation (9) at any given iteration n of the Lagrangian optimization process is:

$$Q_i^{(n)} = X_i^{-1}\begin{pmatrix} ((\delta+1)^2)\left(Z_i + \frac{1}{\delta+1} X_i + vI\right) - \\ \left(Tr(R_{ti} C_i^{-1})^2 Tr(R_{ri} Q_i^{(n-1)}) + \\ Tr(\overline{H}_{\Sigma i} C_i^{-1} R_{ti} C_i^{-1} \overline{H}_{\Sigma i}^H)\right) R_{ri} - \\ Tr(R_{ri} Q_i^{(n-1)}) \overline{H}_{\Sigma i} C_i^{-1} R_{ti} C_i^{-1} \overline{H}_{\Sigma i}^H \end{pmatrix} X_i^{-1} \quad (16)$$

With some mathematical manipulation, equation (16) simplifies to:

$$Q_i^{(n)} = (\delta+1)^2 X_i^{-1/2}\left(\tilde{Z}_i + \frac{1}{\delta+1} I + v X_i^{-1} - \Theta_1 \tilde{R}_{ri} - \Theta_2 \tilde{S}_i\right) X_i^{-1/2} \quad (17)$$

where $$C_i = (I + \Sigma_{j\neq i} H_{\Sigma j}^H Q_j^{(n-1)} H_{\Sigma j}), \text{ with } H_{\Sigma j} = \overline{H}_{\Sigma j} + R_{rj}^{1/2} H_w R_{tj}^{1/2} \quad (18)$$

$$\Theta_1 = (\delta+1)^2 (Tr(R_{ti} C_i^{-1})^2 Tr(R_{ri} Q_i^{(n-1)}) + Tr(\overline{H}_{\Sigma i} C_i^{-1} R_{ti} C_i^{-1} \overline{H}_{\Sigma i}^H)) \quad (19)$$

$$\Theta_2 = (\delta+1)^2 Tr(R_{ri} Q_i^{(n-1)}) \quad (20)$$

$$X_i = (\overline{H}_{\Sigma i} C_i^{-1} \overline{H}_{\Sigma i}^H + Tr(R_{ti} C_i^{-1}) R_{ri}) \quad (21)$$

$$\tilde{R}_{ri} = X_i^{1/2} R_{ri} X_i^{1/2} \quad (22)$$

$$\tilde{S}_i = X_i^{1/2} \overline{H}_{\Sigma i} C_i^{-1} R_{ti} C_i^{-1} \overline{H}_{\Sigma i}^H X_i^{1/2} \quad (23)$$

Analysis of the KKT conditions reveals that they are satisfied for certain values of $\tilde{Z}_i$. In particular, denote the eigenvalue decomposition of $\tilde{Z}_i$ by $U_Z\Lambda_Z U_Z^H$. Likewise, denote the eigenvalue decomposition of $$\left(\frac{1}{\delta+1}I + \nu X_i^{-1} - \Theta_1 \tilde{R}_{ri} - \Theta_2 \tilde{S}_i\right)$$

by $U\Lambda U^H$. Further, let:

$$\Lambda = \begin{bmatrix} \Lambda^+ & 0 \\ 0 & \Lambda^- \end{bmatrix}, \quad (24)$$

where $\Lambda^+$ is the matrix formed by the non-negative entries of $\Lambda$ and $\Lambda^-$ is the matrix formed by the negative entries of $\Lambda$. Finally, let:

$$\Lambda_Z = \begin{bmatrix} \Lambda_{Z1} & 0 \\ 0 & \Lambda_{Z2} \end{bmatrix}, \quad (25)$$

where $\Lambda_{Z1}$ and $\Lambda_{Z2}$ have the same dimensions as $\Lambda^+$ and $\Lambda^-$, respectively. Then the KKT conditions are satisfied, guaranteeing optimality of equation (10), when $U_Z=U$, $\Lambda_{Z1}=0$, and $\Lambda_{Z2}=-\Lambda^-$. That is, when:

$$\tilde{Z}_i = U \begin{bmatrix} 0 & 0 \\ 0 & -\Lambda^- \end{bmatrix} U^H \quad (26)$$

Having computed the uplink input covariances $Q_i^{(n)}$ for all $i=1, 2, \ldots K$ during any given iteration n, the CoMP controller 22 adjusts the uplink input covariances $Q_i^{(n)}$ as needed to satisfy the individual transmit power constraints $P_1, P_2, \ldots P_B$ for the base stations 12. In some embodiments, for example, this adjustment entails normalizing the uplink input covariance matrices $Q_i^{(n)}$ to the trace of the uplink input covariance matrix $Q_j^{(n)}$, where $Q_j^{(n)}$ is the uplink input covariance matrix with the maximum trace. Such operates to allocate full transmit power to one of the base station 12 and allocate transmit powers to the other base stations 12 that are less than their respective individual transmit power constraints $P_1, P_2, \ldots P_B$.

Figure 6:
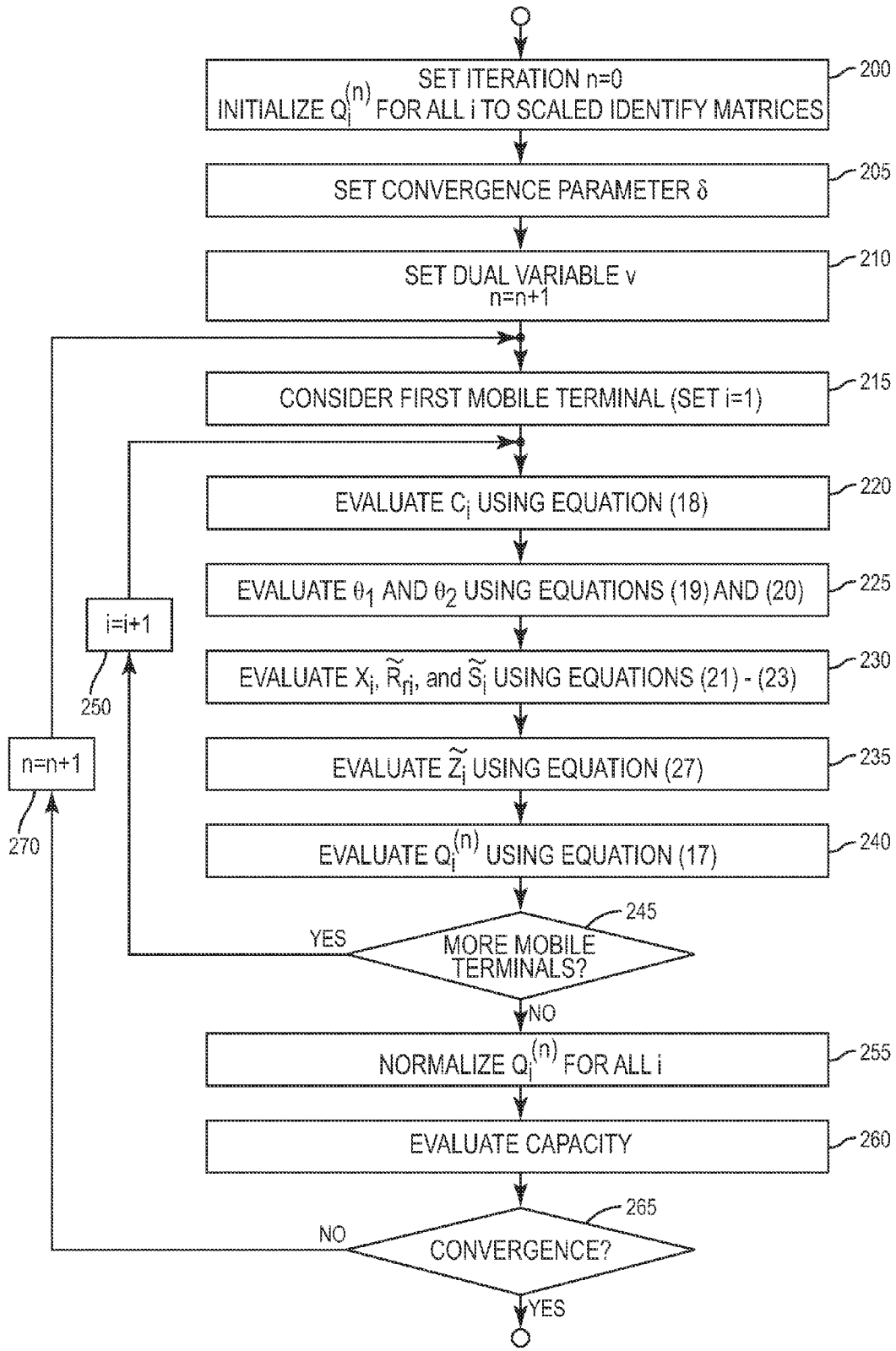
FIG. 6 is a detailed logic flow diagram of a Lagrangian optimization process for joint precoding according to one or more embodiments.

FIG. 6 thus summarizes the CoMP controller's computation of the uplink input covariances $Q_1, Q_2, \ldots Q_K$ using the above Lagrangian optimization process. First, the CoMP controller 22 sets the iteration count n to 0, and initializes the uplink input covariances $Q_i^{(n)}$ to scaled identity matrices, for all i (Block 200). Next, the CoMP controller 22 sets the convergence parameter $\delta$ as discussed above, e.g., based on the SNR (Block 205). The CoMP controller 22 also sets the dual variable v, and prepares for the first iteration of the iterative process by setting n=n+1 (Block 210).

At the beginning of any given iteration n, the CoMP controller 22 considers the first mobile terminal by setting i=1 (Block 215). For that first mobile terminal i=1, the CoMP controller 22 evaluates $C_i$, based on the channel means $\overline{H}_{\Sigma j}$ and channel covariances $R_{rj}^{1/2}$, $R_{tj}^{1/2}$ received for other mobile terminals $j \neq i$ and based on the uplink input covariances $Q_j^{(n-1)}$ computed in a previous iteration n-1 for those other mobile terminals, using equation (18) (Block 220). The CoMP controller 22 next evaluates $\Theta_1$ and $\Theta_2$ using equations (19) and (20) (Block 225), and evaluates $X_i, \tilde{R}_{ri}, \tilde{S}_i$ using equations (21), (22), and (23) (Block 230). Then, the CoMP controller 22 evaluates $\tilde{Z}_i$ using equation (26) (Block 235). Having evaluated $C_i, \Theta_1, \Theta_2, X_i, \tilde{R}_{ri}, \tilde{S}_i$, and $\tilde{Z}_i$ in this way, the CoMP controller 22 finally evaluates the uplink input covariance $Q_i^{(n)}$ for the mobile terminal i=1 using equation (17) (Block 240).

As discussed above, the CoMP controller 22 in computing the uplink input covariances $Q_i^{(n)}$ during any given iteration n collectively updates the uplink input covariances $Q_i^{(n)}$ for all mobile terminals i. Thus, before possibly continuing to the next iteration, the CoMP controller 22 determines whether or not there are more mobile terminals that have not been updated during the current iteration, i.e., whether or not i=K (Block 245). If there are more mobile terminals, the CoMP controller 22 increments i (Block 250) and repeats the above process (Blocks 220-240) in order to evaluate the uplink input covariance $Q_i^{(n)}$ for the next mobile terminal.

Otherwise, the CoMP controller 22 proceeds with adjusting the uplink input covariances $Q_i^{(n)}$ computed during the current iteration n by normalizing them to the trace of the uplink input covariance matrix $Q_j^{(n)}$, where $Q_j^{(n)}$ is the uplink input covariance matrix with the maximum trace (Block 255). The CoMP controller 22 then evaluates the approximation of the capacity (i.e., equation (9)) a function of these adjusted uplink input covariances (Block 260) in order to determine whether or not the process has converged. If the iterative process has not yet converged (NO at Block 265), the CoMP controller increments n (Block 270) and performs another iteration (Blocks 215-260). Otherwise (YES at Block 265), the iterative process ends and the CoMP controller 22 proceeds to maps the obtained uplink input covariances $Q_1, Q_2, \ldots Q_K$ to corresponding downlink input covariances $\Sigma_1, \Sigma_2, \ldots \Sigma_K$.

Those skilled in the art will also appreciate that the above descriptions merely illustrate non-limiting examples that have been used primarily for explanatory purposes. For example, although embodiments thus far have been primarily described with respect to a centralized CoMP architecture, those skilled in the art will recognize that the inventive techniques disclosed and claimed herein are not so limited. Indeed, these techniques may advantageously be applied in a distributed (i.e., decentralized) CoMP architecture as well. In such a distributed CoMP architecture, base stations are interconnected to one another and share amongst themselves the same information provided to a CoMP controller in a centralized CoMP architecture. Accordingly, in a decentralized CoMP architecture, the joint precoding processes described above may be implemented in any given base station.

Figure 7:
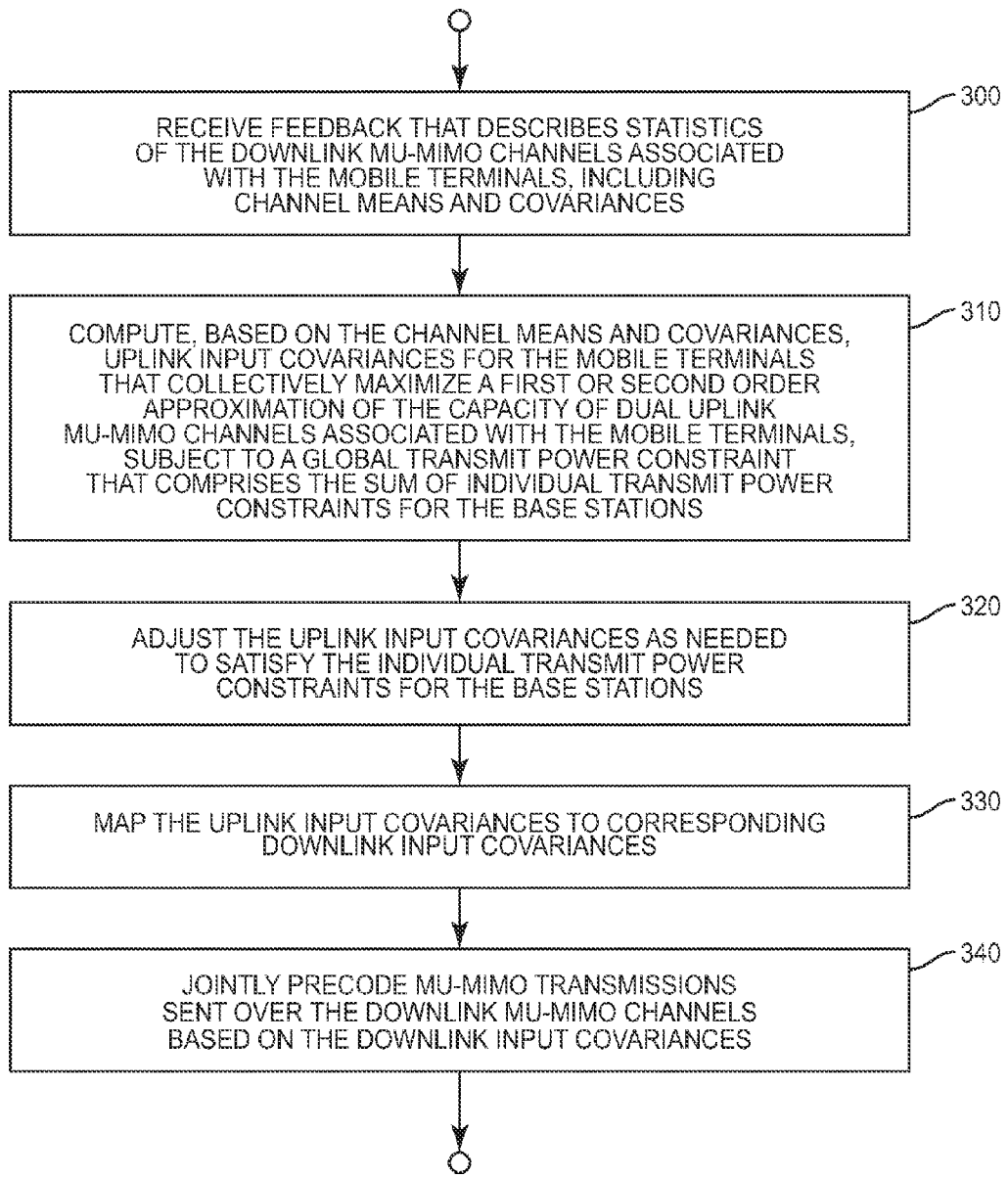
FIG. 7 is a logic flow diagram of a method in a wireless communication system for joint precoding according to one or more embodiments.

In view of the many variations and modifications described above, those skilled in the art will appreciate that a network node (e.g., a CoMP controller 22 or a base station 12) in a wireless communication system generally performs the method illustrated in FIG. 7. This method jointly precodes MU-MIMO transmissions 16 simultaneously sent from geographically distributed base stations 12 to a plurality of mobile terminals 14 over associated downlink MU-MIMO channels. In particular, the method includes receiving feedback that describes statistics of the downlink MU-MIMO channels, including channel mean and covariance (Block 300). The method further includes computing, based on the channel means and covariances, uplink input covariances for the mobile terminals 14 that would collectively maximize a first or second-order approximation of the ergodic capacity of uplink MU-MIMO channels defined as duals of the downlink MU-MIMO channels, subject to a global transmit power constraint $P_{global}$ that comprises the sum of individual transmit power constraints $P_1, P_2, \ldots P_B$ for the base stations 12 (Block 310).

The method further includes adjusting the uplink input covariances as needed to satisfy the individual transmit power constraints $P_1, P_2, \ldots P_B$ for the base stations 12 (Block 320), and then mapping those uplink input covariances to corresponding downlink input covariances (Block 330). Finally, the method includes jointly precoding MU-MIMO transmissions 16 sent over the downlink MU-MIMO channels based on these downlink input covariances (Block 340).

Those skilled in the art will further appreciate that the various "circuits" described may refer to a combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a wireless communication system for jointly precoding multi-user (MU) multiple-input multiple-output (MIMO) transmissions simultaneously sent from geographically distributed base stations to a plurality of mobile terminals over associated downlink MU-MIMO channels, the method comprising:

receiving feedback that describes statistics of the downlink MU-MIMO channels, including channel mean and covariance;

computing, based on the channel means and covariances, uplink input covariances for the mobile terminals that would collectively maximize a first or second-order approximation of the ergodic capacity of uplink MU-MIMO channels defined as duals of the downlink MU-MIMO channels, subject to a global transmit power constraint that comprises the sum of individual transmit power constraints for the base stations, said computing comprising dynamically switching between maximizing the first or the second-order approximation depending on the Signal to Noise Ratio (SNR) at the mobile terminals, and said computing further comprising initializing the uplink input convariances and then collectively updating them during each iteration of an iterative convex optimization process that maximizes said first or second-order approximation subject to the global transmit power constraint, updating the uplink input covariances during any given iteration as a function of uplink input covariances computed in a previous iteration;

adjusting the uplink input covariances as needed to satisfy the individual transmit power constraints for the base stations, wherein said adjusting of the uplink input covariances allocates full transmit power to one of the base stations and allocates transmit powers to the other base stations that are less than their respective individual transmit power constraints;

mapping the uplink input covariances to corresponding downlink input covariances; and jointly precoding MU-MIMO transmissions sent over the downlink MU-MIMO channels based on the downlink input covariances.

2. The method of claim 1, wherein said first or second-order approximation comprises a first or second-order Taylor series approximation.

3. The method of claim 1, wherein the uplink MU-MIMO channels comprise conjugate transposes of the downlink MU-MIMO channels.

4. The method of claim 1, wherein computing the uplink input covariances further comprises setting a convergence parameter that governs the speed at which the iterative convex optimization process converges to the maximum of said first or second-order approximation, within a pre-determined margin of error.

5. The method of claim 4, wherein the method comprises, at each iteration:

evaluating said first or second-order approximation as a function of the uplink input covariances updated during the iteration;

determining if the iterative convex optimization process has converged in accordance with said convergence parameter; and performing a subsequent iteration if the process has not yet converged.

6. The method of claim 4, wherein setting said convergence parameter comprises selecting said convergence parameter from one of a plurality of candidate convergence parameters based on said global transmit power constraint.

7. The method of claim 1, wherein computing uplink input covariances comprises computing uplink input covariances that would collectively maximize either said first order approximation or said second-order approximation depending on whether said global transmit power constraint is less than or greater than, respectively, a pre-determined global transmit power level.

8. The method of claim 1, wherein the uplink input covariances comprise uplink input covariance matrices and wherein said adjusting comprises normalizing the uplink input covariance matrices to the trace of the uplink input covariance matrix with the maximum trace.

9. A network node in a wireless communication system that jointly precodes multi-user (MU) multiple-input multiple-output (MIMO) transmissions simultaneously sent from geographically distributed base stations to a plurality of mobile terminals over associated downlink MU-MIMO channels, the network node comprising:

a communications interface configured to receive feedback that describes statistics of the downlink MU-MIMO channels, including channel mean and covariance;

an computation circuit configured to compute, based on the channel means and covariances, uplink input covariances for the mobile terminals that would collectively maximize a first or second-order approximation of the ergodic capacity of uplink MU-MIMO channels defined as duals of the downlink MU-MIMO channels, subject to a global transmit power constraint that comprises the sum of individual transmit power constraints for the base stations, said computation circuit is further configured to dynamically switch between maximizing the first or the second-order approximation depending on the Signal to Noise Ratio (SNR) at the mobile terminals, and said computing circuit is further configured to compute the uplink input covariances by initializing the uplink input covariances and then collectively updating them during each iteration of an iterative convex optimization process that maximizes said first or second-order approximation subject to the global transmit power constraint, updating the uplink input covariances during any given iteration as a function of uplink input covariances computed in a previous iteration;

an adjustment circuit configured to adjust the uplink input covariances as needed to satisfy the individual transmit power constraints for the base stations, wherein the adjustment circuit is further configured to allocate full transmit power to one of the base stations and allocate transmit powers to the other base stations that are less than their respective individual transmit power constraints;

a mapping circuit configured to map the uplink input covariances to corresponding downlink input covariances; and a joint precoding circuit configured to jointly precode MU-MIMO transmissions sent over the downlink MU-MIMO channels based on the downlink input covariances.

10. The network node of claim 9, wherein said first or second-order approximation comprises a first or second-order Taylor series approximation.

11. The network node of claim 9, wherein the uplink MU-MIMO channels comprise conjugate transposes of the downlink MU-MIMO channels.

12. The network node of claim 9, wherein the computation circuit is further configured to set a convergence parameter that governs the speed at which the iterative convex optimization process converges to the maximum of said first or second-order approximation, within a pre-determined margin of error.

13. The network node of claim 12, wherein the computation circuit is further configured to, at each iteration:
    evaluate said first or second-order approximation as a function of the uplink input covariances updated during the iteration;
    determine if the iterative convex optimization process has converged in accordance with said convergence parameter; and
    perform a subsequent iteration if the process has not yet converged.

14. The network node of claim 12, wherein the computation circuit is configured to set said convergence parameter by selecting said convergence parameter from one of a plurality of candidate convergence parameters based on said global transmit power constraint.

15. The network node of claim 9, wherein the computation circuit is configured to compute uplink input covariances that would collectively maximize either said first order approximation or said second-order approximation depending on whether said global transmit power constraint is less than or greater than, respectively, a pre-determined global transmit power level.

16. The network node of claim 9, wherein the uplink input covariances comprise uplink input covariance matrices, and wherein the adjustment circuit is configured to normalize the uplink input covariance matrices to the trace of the uplink input covariance matrix with the maximum trace.

* * * * *